United States Patent
Jochman

(10) Patent No.: US 9,488,137 B2
(45) Date of Patent: Nov. 8, 2016

(54) SYSTEMS AND METHODS FOR CONTROLLING FUEL VAPOR FLOW IN AN ENGINE-DRIVEN GENERATOR

(71) Applicant: Illinois Tool Works Inc., Glenview, IL (US)

(72) Inventor: Nathan Joe Jochman, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/728,062

(22) Filed: Jun. 2, 2015

(65) Prior Publication Data

US 2015/0267652 A1 Sep. 24, 2015

Related U.S. Application Data

(63) Continuation-in-part of application No. 13/423,980, filed on Mar. 19, 2012, now Pat. No. 9,109,549.

(60) Provisional application No. 61/466,317, filed on Mar. 22, 2011.

(51) Int. Cl.
*F02M 25/08* (2006.01)
*F02B 63/04* (2006.01)
*B60K 15/035* (2006.01)

(52) U.S. Cl.
CPC .... *F02M 25/0836* (2013.01); *B60K 15/03504* (2013.01); *B60K 15/03519* (2013.01); *F02B 63/04* (2013.01); *B60K 2015/03566* (2013.01)

(58) Field of Classification Search
CPC ........... F02M 21/023; F02M 25/0836; F02M 25/0854; B60K 15/03504

USPC ....... 123/2, 3, 445, 454, 459, 461, 480–482, 123/505, 506, 518–520, 525, 198 D, 198 DB
See application file for complete search history.

(56) References Cited

U.S. PATENT DOCUMENTS 4,877,146 A 10/1989 Harris
5,941,218 A 8/1999 DeLand et al.
(Continued)

FOREIGN PATENT DOCUMENTS

| EP | 1895145 | 5/2008 |
|---|---|---|
| JP | H11193756 | 7/1999 |
| WO | 99/05408 | 2/1999 |

OTHER PUBLICATIONS

International Search Report & Written Opinion of PCT/US2012/029971 dated Jun. 20, 2012.
(Continued)

*Primary Examiner* — John Kwon
*Assistant Examiner* — Johnny H Hoang
(74) *Attorney, Agent, or Firm* — McAndrews, Held & Malloy, Ltd.

(57) ABSTRACT

A portable engine-driven system comprising an engine having an air intake passage, a fuel tank operatively coupled to the engine, a valve, and a pressure regulator. The valve may be coupled between the fuel tank and the air intake passage and configured to transition between a first position and a second position. The first position may allow fuel vapor to flow between the fuel tank and the air intake passage and the second position may inhibit the fuel vapor from flowing between the fuel tank and the air intake passage. The pressure regulator may be positioned in line between the fuel tank and the air intake passage.

20 Claims, 11 Drawing Sheets

(56) References Cited

U.S. PATENT DOCUMENTS

| | | |
|---|---|---|
| 6,418,915 B1 | 7/2002 | Harrigan, Sr. |
| 6,681,789 B1 | 1/2004 | Moulis et al. |
| 7,114,492 B2 | 10/2006 | Reddy |
| 7,216,635 B1 | 5/2007 | Roche et al. |
| 7,426,919 B2 | 9/2008 | Kano et al. |
| 7,536,251 B2 | 5/2009 | Saito et al. |
| 8,240,292 B1 | 8/2012 | Roche et al. |
| 8,443,787 B2 | 5/2013 | Schondorf et al. |
| 8,770,175 B2 | 7/2014 | Kitamura et al. |
| 2003/0183180 A1 | 10/2003 | Wada |
| 2004/0168654 A1 | 9/2004 | Radtke |
| 2007/0186910 A1 | 8/2007 | Leone et al. |
| 2008/0000456 A1 | 1/2008 | Modien |
| 2008/0202447 A1 | 8/2008 | Kochi et al. |
| 2008/0202480 A1 | 8/2008 | Yamamoto et al. |
| 2008/0236551 A1 | 10/2008 | Althof et al. |
| 2008/0251053 A1 | 10/2008 | Shears et al. |
| 2008/0251055 A1 | 10/2008 | Schmalz et al. |
| 2009/0025694 A1* | 1/2009 | Shinagawa ...... B60K 15/03504 123/519 |
| 2010/0031932 A1 | 2/2010 | Mai et al. |
| 2010/0071672 A1 | 3/2010 | Grunwald et al. |
| 2011/0067676 A1 | 3/2011 | Mai et al. |
| 2012/0240900 A1 | 9/2012 | Laitala et al. |

OTHER PUBLICATIONS

International Search Report & Written Opinion of PCT/US2016/027265 dated Jul. 1, 2016 (14 pages).

\* cited by examiner

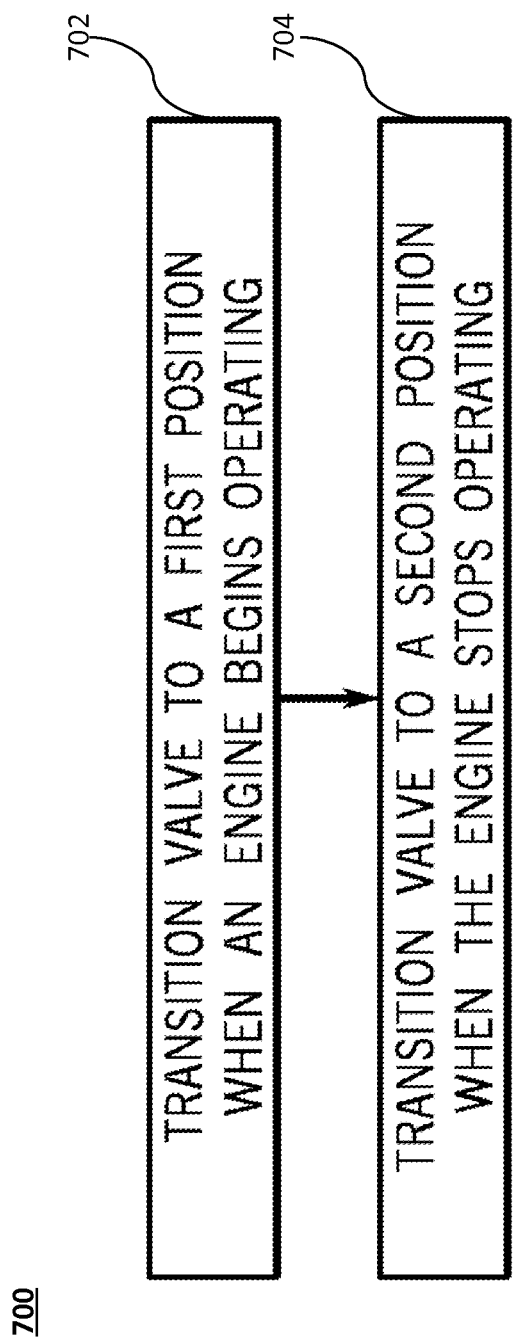

//SYSTEMS AND METHODS FOR CONTROLLING FUEL VAPOR FLOW IN AN ENGINE-DRIVEN GENERATOR

RELATED APPLICATIONS

This application claims priority to, and is a continuation-in-part of co-pending U.S. application Ser. No. 13/423,980, having a filing date of Mar. 19, 2012, (U.S. Publication No. 2012/0240900), which is incorporated herein by reference, and which claims priority to U.S. Provisional Application No. 61/466,317, having a filing date of Mar. 22, 2011, which is also incorporated herein by reference in its entirety.

BACKGROUND OF THE INVENTION

Welding is a process that has increasingly become ubiquitous in all industries. Welding is, at its core, simply a way of bonding two pieces of metal. Larger welding systems can generate a welding current output in excess of 100 amps, while micro-welding may employ a micro arc under a few amps.

Welding systems may be coupled to the power grid, or use a fuel-powered engine to drive an electric generator, which in turn generates the required current for the specific welding operation. The size of the engine and electric generator is dictated by the maximum welding current output rating of the welder. For instance, a welder that is rated to generate a 300-amp, 33.3 volt arc can require at least 10 kilowatts of power to generate such an arc. Indeed, the power source is often configured to output a higher power (e.g., about 30% higher) than what is required by the arc to account for power loss that may result from, for example, a weld cable voltage drop. Thus, the engine in such a welder must have sufficient horse power to drive an electric generator to generate about 13 kilowatts of power so as to supply the maximum welding current output rating of the welder at any given time.

A liquid fuel is often used as a combustible material to operate the engine of an engine-driven generator. As will be appreciated, fuel vapor may be generated in the fuel tank under normal operating conditions. Certain configurations of engine-driven generators may direct the fuel vapors to a combustion air intake of the engine. When fuel vapors are present at the combustion air intake of the engine during shutdown of the engine-driven generator, however, the engine-driven generator may "diesel" or "run on." When this occurs, the engine-driven generator may operate undesirably for a period of time (e.g., multiple seconds or minutes). For example, the engine may keep running for a short period after being turned off, due to fuel igniting without a spark.

According, the subject disclosure related to a fuel delivery system for a generator, such as those used in conjunction with welders, plasma cutters, and the like. More specifically, the present disclosure relates to a generator fuel tank employing fuel vapor controlling techniques, thereby improving fuel delivery issues that hinder the industry.

BRIEF SUMMARY

The invention relates to fuel delivery systems for a generator. More specifically, the invention relates to a generator fuel tank employing fuel vapor controlling techniques. Systems, methods, and apparatuses are provided for fuel delivery systems and generator fuel tanks employing fuel vapor controlling techniques in welding equipment, substantially as illustrated by and/or described in connection with at least one of the figures, as set forth more completely in the claims.

According to a first aspect, an engine-driven generator comprises: an engine having an air intake passage, wherein the engine is configured to drive a generator; a fuel tank operatively coupled to the engine; a valve positioned between the fuel tank and the air intake passage, wherein the valve comprises an inlet, a first outlet, and a second outlet, the inlet being configured to receive fuel vapor from the fuel tank, the first outlet being configured to provide the fuel vapor to the air intake passage, and the second outlet being configured to provide the fuel vapor to the atmosphere or to a storage container; a pressure regulator positioned in line between the fuel tank and the air intake passage, wherein the pressure regulator comprises a pressure relief valve configured to release fuel vapor between the fuel tank and the air intake passage when a pressure of the fuel vapor reaches a predetermined threshold pressure; and a control device configured to transition the valve between a first position and a second position, wherein the first position allows fuel vapor to flow from the fuel tank to the air intake passage, and the second position inhibits the fuel vapor from flowing from the fuel tank to the air intake passage.

According to a second aspect, an engine-driven generator comprises: an engine having an air intake passage, wherein the engine is configured to drive a generator; a fuel tank operatively coupled to the engine; a valve positioned between the fuel tank and the air intake passage; a pressure regulator positioned in line between the fuel tank and the air intake passage, wherein the pressure regulator comprises a pressure relief valve configured to release fuel vapor when a pressure of the fuel vapor reaches a predetermined threshold pressure; and a control device configured to transition the valve between a first position and a second position, wherein the first position allows fuel vapor to flow from the fuel tank to the air intake passage and the second position inhibits the fuel vapor from flowing from the fuel tank to the air intake passage.

According to a third aspect, an engine-driven system comprises: an engine having an air intake passage; a fuel tank operatively coupled to the engine; a valve coupled between the fuel tank and the air intake passage, the valve being configured to transition between a first position and a second position, wherein the first position allows fuel vapor to flow between the fuel tank and the air intake passage and the second position inhibits the fuel vapor from flowing between the fuel tank and the air intake passage; and a pressure regulator positioned in line between the fuel tank and the engine, wherein the pressure regulator comprises a pressure relief valve configured to release fuel vapor between the fuel tank and the air intake passage when a pressure of the fuel vapor between the fuel tank and the air intake passage reaches a predetermined threshold pressure.

In certain aspects, the valve may comprise an inlet, a first outlet, and a second outlet, the inlet being configured to receive fuel vapor from the fuel tank, the first outlet being configured to provide the fuel vapor to the air intake passage, and the second outlet being configured to provide the fuel vapor to the atmosphere or to a storage container.

In certain aspects, the pressure regulator is positioned in line between the fuel tank and the valve.

In certain aspects, the pressure regulator is positioned in line between the valve and the air intake passage.

In certain aspects, the air intake passage may be configured to receive the fuel vapor and provide the fuel vapor to a carburetor.

In certain aspects, the air intake passage may be configured to receive the fuel vapor and provide the fuel vapor to an electronic fuel injection system.

In certain aspects, the valve may be configured to be in the first position while the engine is operating and to be in the second position while the engine is not operating.

In certain aspects, the predetermined threshold pressure is a positive pressure value less than, or equal to, 3.0 PSI.

In certain aspects, the valve may be configured to transition between the first position and the second position based on a measured oil pressure or a measured voltage.

In certain aspects, the second outlet may be configured to provide the fuel vapor to a storage container.

BRIEF DESCRIPTION OF THE DRAWINGS

The features of the present invention will best be understood from a detailed description of the invention and a preferred embodiment thereof selected for the purposes of illustration and shown in the accompanying drawings in which:

FIG. 7 illustrates a flow chart of an embodiment of a method for controlling fuel vapor flow in an engine-driven generator system in accordance with aspects of the present disclosure.

DETAILED DESCRIPTION

Figure 1A:
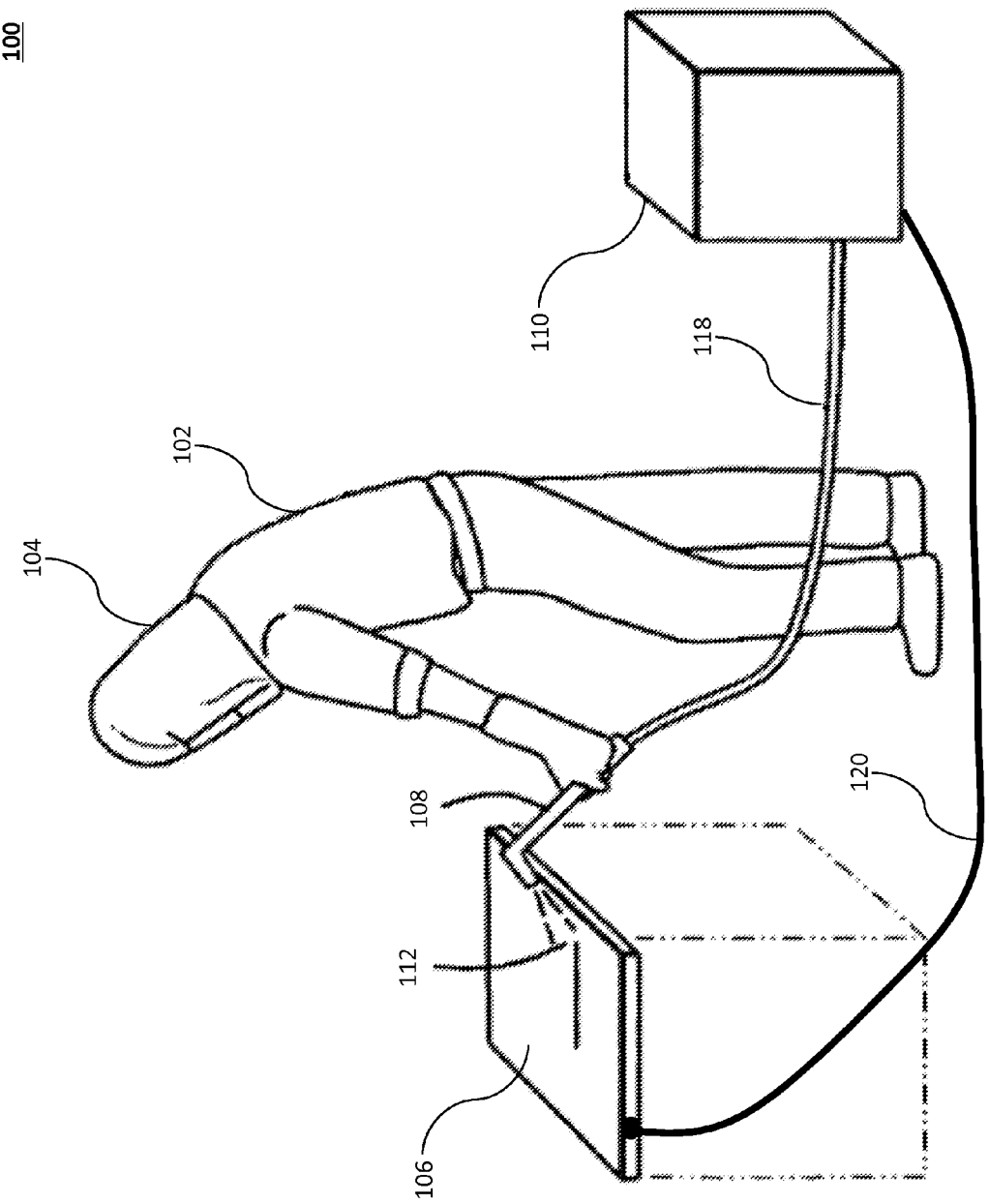
FIGS. 1a and 1b illustrate an exemplary manual arc welding system in accordance with an aspect of this disclosure.

The present disclosure is directed to systems, methods, and apparatuses for delivering fuel to a generator. More specifically, the present disclosure is directed to a generator employing fuel vapor controlling techniques. Preferred embodiments of the present invention will be described hereinbelow with reference to the figures of the accompanying drawings. Like reference numerals are used throughout the drawings to depict like or similar elements. In the following description, well-known functions or constructions are not described in detail, since such descriptions would obscure the invention in unnecessary detail.

For the purpose of promoting an understanding of the principles of the claimed technology and presenting its currently understood, best mode of operation, reference will be now made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

Figure 1B:
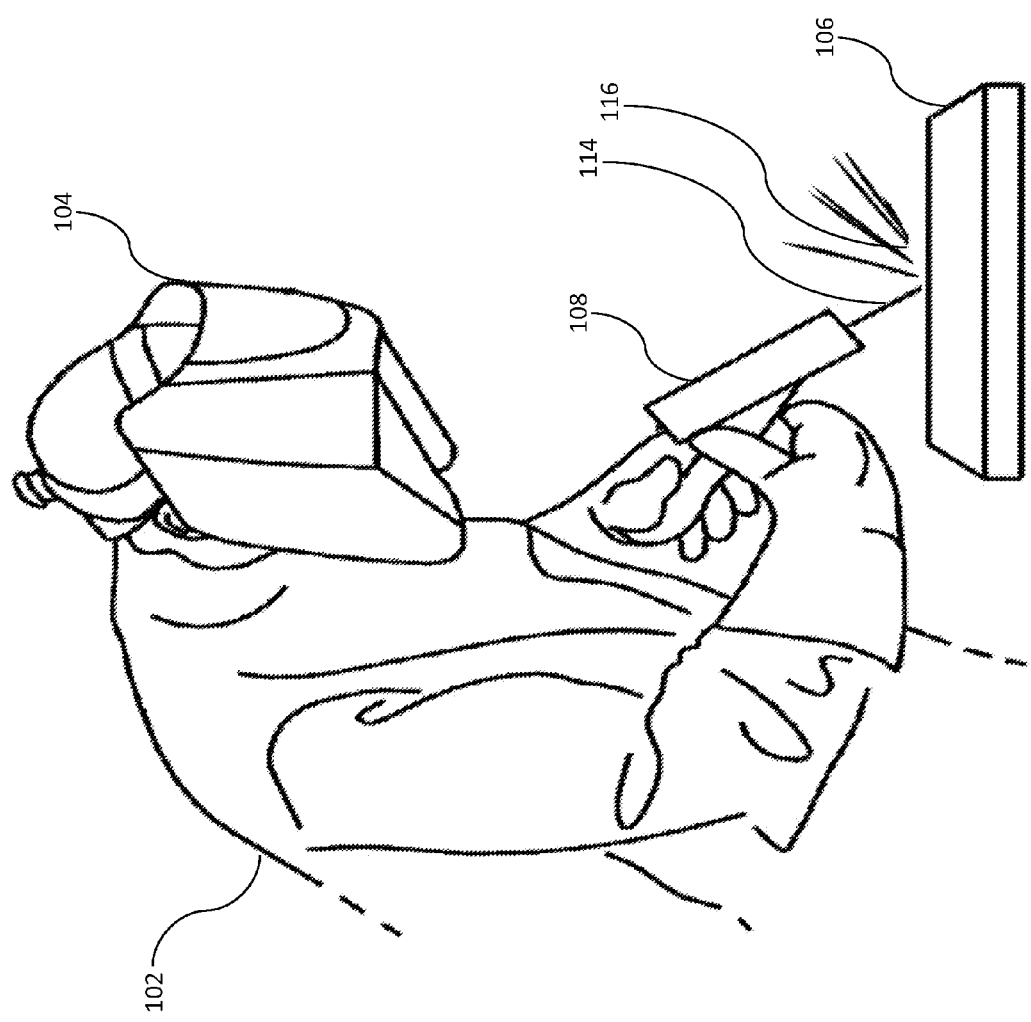

Referring to FIGS. 1a and 1b, an example manual welding equipment 110 is shown in which an operator 102 is wearing welding headwear 104 and welding a workpiece 106 using a welding tool 108 (e.g., a torch) to which power or fuel is delivered by welding equipment 110 via conduit 118 (for electrical welding, ground conduit 120 provides the return path). The welding equipment 110 may comprise a power or fuel source (generally referred to as a "power supply"), optionally a source of an inert shield gas and, where wire/filler material is to be provided automatically, a wire feeder.

The welding equipment 110 of FIGS. 1a and 1b may be configured to cut material (e.g., as a plasma cutter) or form a weld joint 112 by any, for example, electric welding techniques (such as shielded metal arc welding (SMAW), more commonly known as stick welding), metal inert gas welding (MIG), flux cored arc welding (FCAW) tungsten inert gas welding (TIG), and resistance welding. TIG welding may involve no external filler metal or may involve manual, automated or semi-automated external metal filler. Optionally in any embodiment, the welding equipment 110 may be arc welding equipment that provides a direct current (DC) or alternating current (AC) to a consumable or non-consumable electrode 114 (better shown in, for example, FIG. 1b) of a welding tool 108 (e.g., a torch), which may be a TIG torch, a MIG torch, a flux cored torch (commonly called a MIG "gun"), or a stick electrode holder (commonly called a "stinger").

Figure 1C:
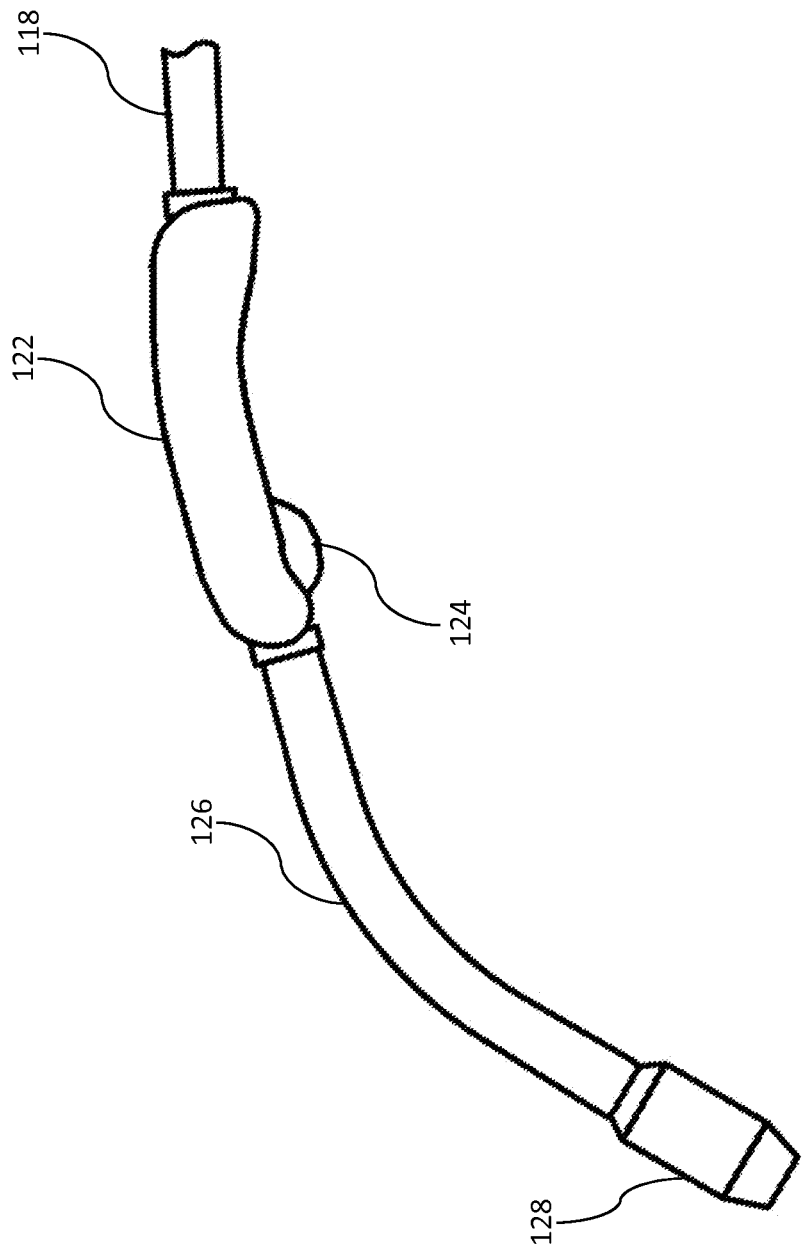
FIG. 1c illustrates an enlarged diagram of an exemplary manual welding tool.
Figure 2:
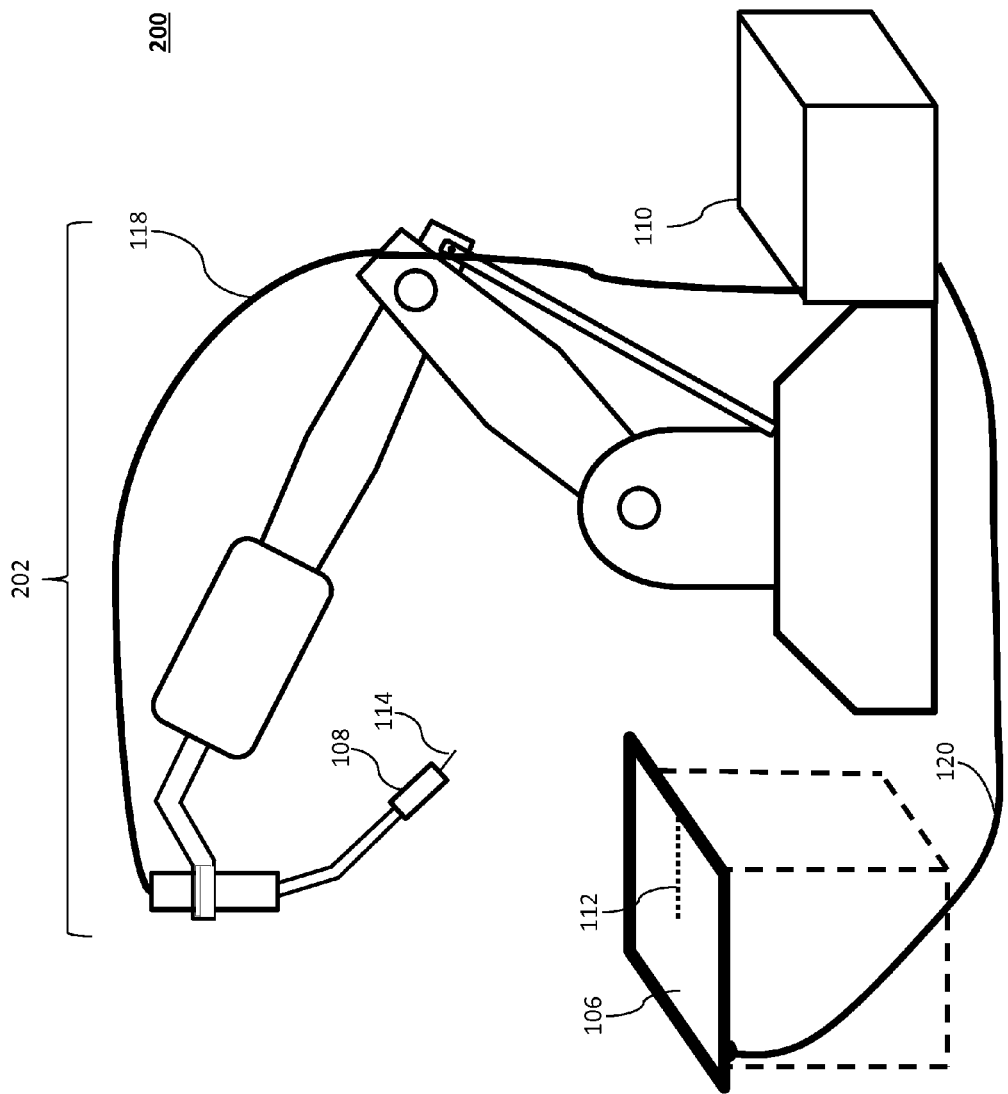
FIG. 2 illustrates an exemplary robotic arc welding system in accordance with an aspect of this disclosure.

In operation, the electrode 114 delivers the current to the point of welding on the workpiece 106. In the welding equipment 110, the operator 102 controls the location and operation of the electrode 114 by manipulating the torch 108 and triggering the starting and stopping of the current flow via, for example, a trigger 124. When current is flowing, an arc 116 is developed between the electrode 114 and the workpiece 106. The conduit 118 and the electrode 114 thus deliver current and voltage sufficient to create the electric arc 116 between the electrode 114 and the workpiece 106. The arc 116 locally melts the workpiece 106 and welding wire (or rod) supplied to the weld joint 112 (the electrode 114 in the case of a consumable electrode, or a separate wire or rod in the case of a non-consumable electrode) at the point of welding between electrode 114 and the workpiece 106, thereby forming a weld joint 112 when the metal cools. A plasma cutter operates in a similar fashion. Specifically, an inert, or semi-inert, gas is blown at high speed out of a nozzle 128, while an electrical arc is formed through that gas from the nozzle 128 to the workpiece 106 being cut, turning some of that gas to plasma. The plasma is hot enough to melt the workpiece 106 being cut and moves fast enough to blow molten material away from the cut. FIG. 1c illustrates an enlarged diagram of an exemplary manual welding tool 108, specifically, a torch. As illustrated, a manual welding tool generally comprises a handle 122, a trigger 124, a conductor tube 126, and a nozzle 128 at the distal end of the conductor tube 126. Applying pressure to the trigger 124 (i.e., actuating the trigger) initiates the welding (or cutting, where applicable) process, whereby output power is provided, and the wire feeder 214, and/or the gas supply 216 are activated as needed. In certain aspects, in lieu of a human operator 102, a robot 202 (e.g., a robotic arm) may control the location and operation of the electrode 114. An example of such an arrangement is illustrated in FIG. 2, which illustrates an exemplary robotic arc welding system 200 in accordance with an aspect of this disclosure. In the welding system 200, the robot 202 controls the location and operation of the electrode 114 by manipulating the welding tool 108 and triggering the starting and stopping of the current flow.

Figure 3:
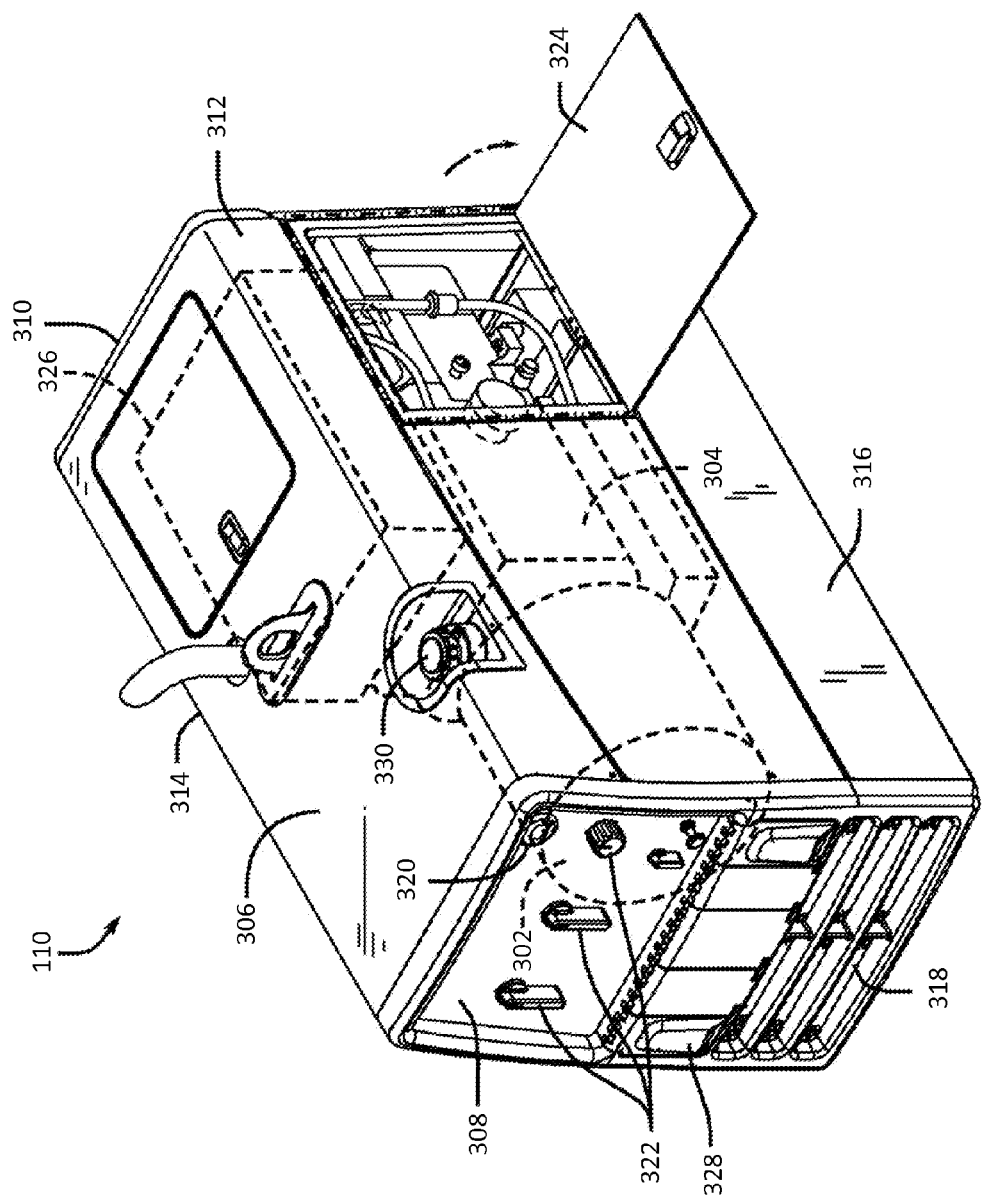
FIG. 3 illustrates example welding equipment in accordance with an aspect of this disclosure.

FIG. 3 illustrates a portable engine-driven welding equipment 110 having a generator 302 drivingly coupled to an engine 304 in a single enclosure 306 in accordance with an exemplary embodiment of the present technique. While the engine-driven welding equipment 110 of the subject is described as being portable and configured within a single enclosure 306, the subject teachings shall not be limited to portable engine-driven power supplies, but rather, may be applied to stationary and/or larger engine-driven power supplies, such as those that are used in connection with robotic arc welding system 200.

As discussed in detail below, the welding equipment 110 may employ devices for controlling fuel vapor flow. For example, the welding equipment 110 may employ devices that allow fuel vapor to flow to the engine 304 while the engine 304 is operating, and inhibit fuel vapor from flowing to the engine 304 while the engine 304 is not operating. Therefore, "dieseling" may be reduced and/or eliminated by blocking fuel vapors from flowing to the engine 304 at undesired times. As will be appreciated, the disclosed embodiments may be used in a variety of electromechanical systems, including welding systems, non-welding systems, motor-generator systems, and so forth.

The single enclosure 306 may include multiple functionalities in one portable system to improve productivity and reduce space consumption. Specifically, the welding equipment 110 is configured to output electrical power for a variety of applications, including welding, cutting, battery charging, jump starting, and so forth. Moreover, the welding equipment 110 includes intelligence (e.g., logic in software and/or hardware) to adjust the outputs based on various feedback of the welding equipment 110, and any external devices, receiving the electrical power from the power supply module (e.g., engine 304). For example, the welding equipment 110 does not randomly provide output power for welding and/or charging, but rather the welding equipment 110 analyzes various parameters, executes various logic, and intakes sensed feedback to make an intelligent decision regarding the output.

In some embodiments, however, the welding equipment 110 may provide output power without adjustment or analysis of any parameters or feedback. The enclosure 306 may comprise a front panel 308, a rear panel 20, a right side 312, and a left side 314, all engaging a base 316 to complete the enclosure 306. The enclosure 306 protects, inter alia, the engine 304 and the generator 302 from dust, debris, and rough handling. The enclosure 306 also reduces noise and helps to cool the engine 304 by preventing hot air recirculation via a cool air inlet 318 on the front panel 308 by pulling air through the interior volume of the enclosure 306. In certain embodiments, the rear panel 310 may also include an air inlet for air intake and/or exhaust flow.

A control system regulates the electrical power supplied by the generator 302 and allows for it to be used for a welding process and/or auxiliary power to other devices or tools. The control circuitry comprises circuitry (e.g., a microcontroller and memory) operable to process data from the operator interface, the generator 302, one or more sensors, the wire feeder, and/or the gas supply; and to output data and/or control signals to the operator interface, the generator 302, the wire feeder, and/or the gas supply.

The front panel 308 may provide an operator interface, which may comprise electromechanical interface components (e.g., screen, speakers, microphone, buttons/switches, touchscreen, cameras, voice recognition or hand gesture recognition input device, an industrial personal computer (IPC) or programmable logic controller (PLC), barcode scanner, etc.) and associated drive circuitry. The operator interface may generate electrical signals in response to operator input (e.g., screen touches, button/switch presses, voice commands, remote sensor input, etc.). Driver circuitry of the operator interface may condition (e.g., amplify, digitize, etc.) the signals and communicate them to the control circuitry. The operator interface may generate audible, visual, and/or tactile output (e.g., via speakers, a display, and/or motors/actuators/servos/etc.) in response to signals from the control circuitry. In certain aspects, one or more components of the operator interface may be positioned on the welding tool and/or, whereby control signals from the one or more components are communicated to the control circuitry via conduit 218 or via a network.

In one embodiment, the front panel 308 may include various indicators 320 to provide feedback to the user. For example, the indicator 320 may include an LCD to display voltage, amperage, air pressure, and the like. Further, in some embodiments, a user input 322 may include a touch screen, knobs, and/or buttons configured for a mode of operation, an output level or type, etc. For instance, the user input 322 may include a dial rotatable to select a mode of operation, such as a DC weld, an AC weld, a battery charge, or a tool operation. Embodiments of the front panel 308 include any number of inputs and outputs, such as welding methods, oil pressure, oil temperature, and system power.

A power supply comprises circuitry for generating (or otherwise providing) power to be delivered to a welding electrode via conduit 118. The welding equipment 110 may comprise, for example, one or more generators, voltage regulators, current regulators, switch mode power supplies, and/or the like. The voltage and/or current output by the power supply may be controlled by a control signal from the control circuitry. In an exemplary embodiment, the power supply comprises an engine 304 and a generator 302, where the engine 304 provides output power (e.g., a mechanical output) to drive the welding generator 302. In certain embodiments, the power from the engine 304 operates the generator 302 via a drive shaft. The drive shaft may be directly or indirectly coupled to one or more driven mechanisms. For example, an indirect coupling may include a belt and pulley system, a gear system, or a chain and sprocket system. In the present embodiment, the drive shaft couples directly to the generator 302. However, either arrangement can be used for the connection between the engine 304 and the generator 302.

In an embodiment, the engine 304 may include a combustion engine powered by gas or diesel, liquefied petroleum (LP) fuel, natural gas, or other fuel, and driving one or more drive shafts. For example, the engine 304 may include an industrial gas/diesel engine configured to output anywhere from about 9 horsepower (Hp) to about 30 Hp, or more. Generally, the weight of such an engine 304 may vary with the size and Hp rating of the engine 304. For example, a 23 Hp engine may weigh approximately 100 lbs., whereas a similar 9 Hp engine may weigh less than approximately 50 lbs. Thus, the portable welding equipment 110 may benefit from the use of a smaller engine 304.

As discussed previously, embodiments may include a generator 302 coupled to the engine 304. Thus, the generator 302 may convert the power output (e.g., mechanical energy) of the engine 304 to an electrical power. Generally, the generator 302 includes a device configured to convert a rotating magnetic field into an electrical current (e.g., AC generator). The generator 302 includes a rotor (the rotating portion of the generator) and a stator (the stationary portion of the generator). For example, the rotor of the generator 302 may include the rotating drive shaft of the engine 304 disposed in a single stator configured to create an electrical current (e.g., welding current) from the rotation of the magnetic field. In an embodiment, the generator may include a four-pole rotor and three-phase weld output configured to provide beneficial welding characteristics. Further, the generator 302 may include a plurality of independent winding sections in the rotors and/or stators, such that the generator 302 is configured to output multiple electrical outputs having different characteristics. For example, the generator 302 may include a first section configured to drive a welding current to a welder and a second section configured to drive a current for other AC outputs. In some embodiments, multiple generators 12 may be connected to the drive shaft. In an example implementation, the power supply may comprise circuitry for measuring the voltage and/or current on the conduit 118 (at either or both ends of the conduit 118) such that reported voltage and/or current is an actual value and not simply an expected value based on calibration.

As depicted in FIG. 3, the enclosure 306 may include various access panels to enable servicing, repair, and so forth. For example, a side access panel 324 may be configured to attach to opposite sides of the enclosure 306. The top of the enclosure 306 may include an access panel or hatch 326, which may be both rotatable between open and closed positions above the components of the power supply module 304. The top hatch 326 can rotate open to enable access to the engine 304. Similarly, the side access panel 324 can rotate open to enable access to the engine 304, oil filter, spark plugs, etc.

The illustrated welding equipment 110 also includes various external connections 328. The external connections 328 may include various outlets and couplers configured to provide access to the electrical power generated by the power supply module 304. For example, the external connections 328 may include an AC power output and a DC power output, which may be coupled to various devices and tools. For example, the AC power output may provide auxiliary power to various devices or tools integrated within or coupled to the power supply module 304. The DC power output can be coupled to various welding and cutting tools, such as a welding torch. The welding devices may receive current from the generator 302 via the external connections 328. As will be appreciated, the torch may include various welding devices, such as a TIG (tungsten inert gas) torch, a MIG (metal inert gas) gun, or a plasma cutting torch. The welding equipment 110 may also include welding cable connecting the torch to the external connections 328. Further, the welding equipment 110 may include other components necessary for operation of a welding device, such as a wire feeder, a shielding gas supply, and/or any other component, or combination thereof. The welding equipment 110 also includes a fuel tank that holds fuel to be provided to the engine 304. The fuel tank includes an opening for adding fuel to the fuel tank. A fuel cap 330 is used to cover the opening of the fuel tank and may be used to vent fuel vapor. For example, the fuel cap 330 may include a pressure relief valve for releasing fuel vapor when pressure within the fuel tank exceeds a threshold pressure. The fuel cap may include a check valve to allow air into fuel tank 402 when a pressure within the fuel tank 402 is negative.

In certain aspects, the welding equipment 110 may further comprise a wire feeder module, a gas supply module, and/or a communication interface circuitry operatively coupled to an antenna and/or a communication port. The gas supply module is configured to provide gas (e.g., shielding gas) via conduit 118 for use during the welding or cutting process. Shielding gases are generally inert, or semi-inert, gases used in several welding processes, most notably gas metal arc welding and gas tungsten arc welding (e.g., MIG and TIG). A purpose of shielding gases is to protect the weld area from oxygen, and moisture containing hydrogen. Depending on the materials being welded, these atmospheric gases can reduce the quality of the weld or make the welding more difficult. The gas supply module may comprise an electrically controlled valve for controlling the rate of gas flow. The valve may be controlled by a control signal from control circuitry (which may be routed through the wire feeder, or come directly from the control circuitry). The gas supply module may also comprise circuitry for reporting the present gas flow rate to the control circuitry. In terms of plasma cutters, the gas supply module may be configured to provide gas for cutting purposes. In an example implementation, the gas supply module may comprise circuitry and/or mechanical components for measuring the gas flow rate such that the reported flow rate is an actual flow value and not simply an expected flow value based on calibration, thereby providing increased reliability and accuracy.

The wire feeder module may be configured to deliver a consumable wire electrode to the weld joint 112. The wire feeder module may comprise, for example, a spool for holding the wire, an actuator for pulling wire off the spool to deliver to the weld joint 112, and circuitry for controlling the rate at which the actuator delivers the wire. The actuator may be controlled based on a control signal from the control circuitry. The wire feeder module may also comprise circuitry for reporting the present wire speed and/or amount of wire remaining to the control circuitry. In an example implementation, the wire feeder module may comprise circuitry and/or mechanical components for measuring the wire speed, such that reported speed is an actual speed, and not simply an expected value based on calibration, thereby providing increased reliability. For TIG or stick welding, the wire feeder module may not be used (or may not even be present in the welding equipment 110).

Figure 4:
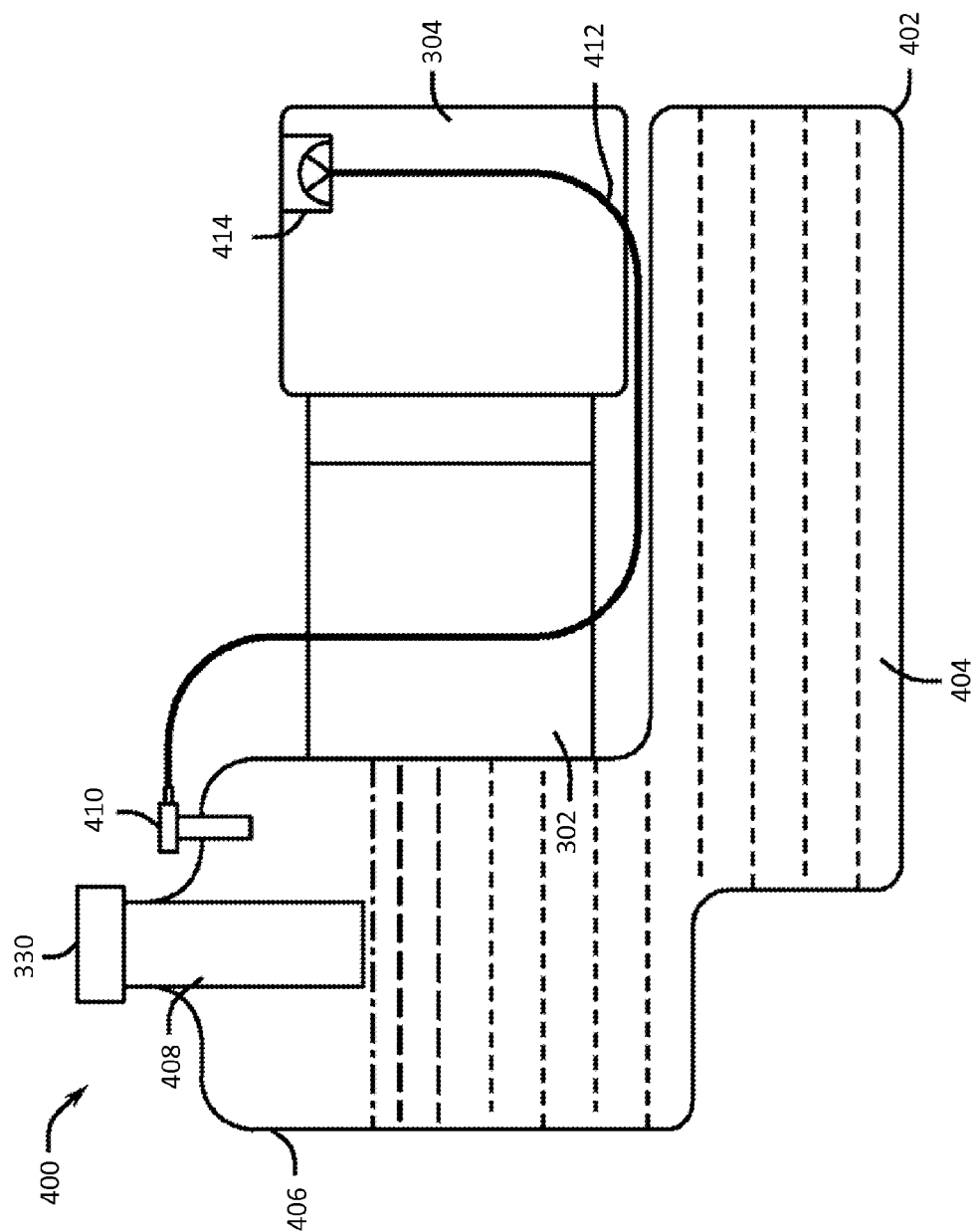
FIG. 4 illustrates a pictorial view of an embodiment of a vapor flow control system for controlling fuel vapor flow in an engine-driven generator in accordance with aspects of the present disclosure.

FIG. 4 illustrates a pictorial view of an embodiment of a vapor flow control system 400 for controlling fuel vapor flow in the engine-driven welding equipment 110 (or in any engine-driven system, such as portable engine-driven systems). The vapor flow control system 400 includes a fuel tank 402 for holding fuel 404 (e.g., generally liquid fuel) that is provided to the engine 304 and is used to power the engine 304. As will be appreciated, fuel vapor of the fuel 404 may collect in and contact an upper portion 406 (e.g., vapor space) of the fuel tank 402. The upper portion 406 may act as an accumulator for fuel vapor. In certain embodiments, the volume of the upper portion 406 may be approximately 5 to 20% of the total fuel tank 402 volume. The fuel cap 330 covers an opening used for filling the fuel tank 402 with the fuel 404. To inhibit fuel vapor from freely flowing into the atmosphere, the fuel cap 330 may generally seal the opening (e.g., the fuel cap 330 may not include apertures that allow fuel vapor to freely flow out of the fuel tank 402). A neck tube 408 may extend from the fuel cap 330 and may be used to help determine the recommended amount of liquid fuel 404 in the fuel tank 402 to allow for thermal expansion of the fuel 404.

A valve 410 may be used to direct fuel vapor from the fuel tank 402 (e.g., the upper portion 406 of the fuel tank 402) to the engine 304. As illustrated, the valve 410 may be coupled to the upper portion 406 of the fuel tank 402. Further, a hose 412 couples the valve 410 to an air intake 414 of the engine 304. The engine 304 may combust fuel vapor from the fuel tank 402 and inhibit the fuel vapor from being vented (e.g., escaping from the vapor flow control system 400) to the atmosphere, such as while the engine 304 is operating. For example, the valve 410 may be closed (e.g., to inhibit fuel vapor from flowing to the engine 304) while the engine 304 is not operating and the valve 410 may be opened (e.g., to enable fuel vapor to flow to the engine 304) while the engine 304 is operating. When in the closed position, the valve 410 may simply shut off all vapor flow between the fuel tank 402 and the engine 304 (i.e., using a two-way valve arrangement), or, in the alternative, may redirect the vapor to the atmosphere or a storage container (i.e., using a three-way valve arrangement). The valve 410 may be any suitable valve and may be controlled by any suitable controlling mechanism of the engine-driven welding equipment 110. Suitable two-way and three-way valve arrangements are described in commonly owned U.S. Patent Publication No. 2012/0240900, which was filed Mar. 19, 2012 and is entitled "Systems and Methods for Controlling Fuel Vapor Flow in an Engine-Driven Generator."

In certain embodiments, the fuel cap 330 may include a pressure relief portion to relieve vapor pressure buildup in the fuel tank 402, such as for times while the engine 304 is not operating and a two-way valve arrangement is employed. In other embodiments, the valve 410 may also include a pressure relief portion to relieve vapor pressure buildup in the fuel tank 402. When a three-way valve arrangement is employed, however, vapor pressure buildup in the fuel tank 402 may be relieved via pressure regulator 526. As described, the vapor flow control system 400 may be used to provide fuel vapor to the engine 304 when desired. Accordingly, fuel vapor may be inhibited from flowing to the engine 304 at undesirable times (e.g., such as while shutting off the engine-driven welding equipment 110). Therefore, undesirable behavior, such as "dieseling" may be reduced and/or eliminated.

Figure 5A:
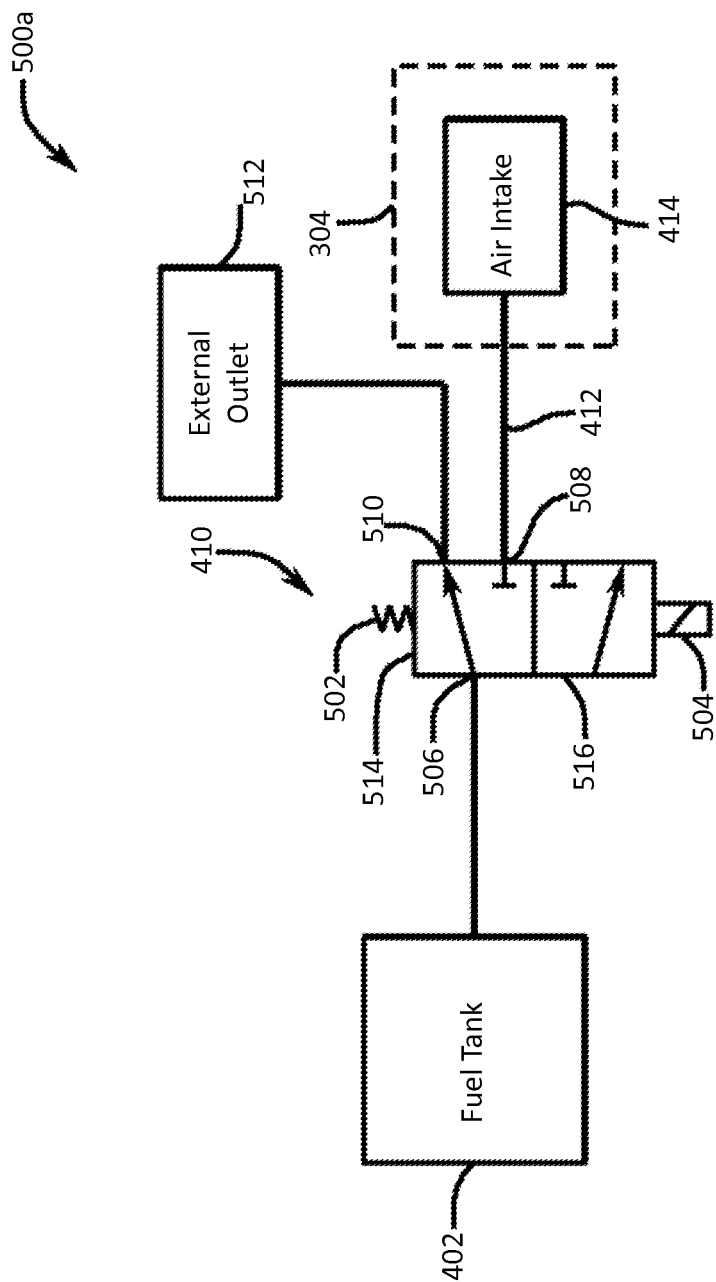
FIG. 5a illustrates a block diagram of an embodiment of a system for controlling fuel vapor flow in an engine-driven generator using a three-way valve in accordance with aspects of the present disclosure.

FIG. 5a illustrates a block diagram of an embodiment of a vapor control system 500a for controlling fuel vapor flow in the engine-driven welding equipment 110 using a three-way valve 410 that directly enables flow from the inlet port 506 to the relief port 510, or from the inlet port 506 to the outlet port 508. As illustrated, the valve 410 includes a default position 514 and a controlled position 516. In the default position 514, fuel vapor may flow between the fuel tank 402 and the external outlet 512, while fuel vapor flow between the fuel tank 402 and the engine 304 is blocked. In the controlled position 516, fuel vapor may flow between the fuel tank 402 and the engine 304 (e.g., from the valve inlet 506 to the valve outlet 508), while fuel vapor flow between the fuel tank 402 and the external outlet 512 is blocked. Specifically, fuel vapor may flow through the valve 410 and the hose 412 to the air intake 414 of the engine 304. In certain aspects, fuel vapor may flow from the air intake 414 to a carburetor of the engine 304. In other aspects, fuel vapor may flow from the air intake 414 to an electronic fuel injection system of the engine 304.

Force applied by a spring 502 holds the valve 410 in the default position 514. The force of the spring 502 may be overcome by energizing a solenoid 504 to transition the valve 410 to the controlled position 516. As will be appreciated, as long as the solenoid 504 is energized, the valve 410 will be held in the controlled position 516. The solenoid 504 may be energized by any suitable device of the engine-driven generator 110, as explained in detail below. A valve inlet 506 and a valve outlet 508 allow the fuel vapor to flow through the valve 410 (e.g., when the valve 410 is in the controlled position 516).

The valve 410 may be configured to be in the default position 514 while the engine 304 is not operating. Further, the valve 410 may be configured to be in the controlled position 516 while the engine 304 is operating. Accordingly, pressure will not generally build within the fuel tank 402 while the engine 304 is operating because the valve 410 is in the controlled position 516. Therefore, the three-way valve 410 will generally operate (continue to pass fuel vapor) while the engine 304 is not operating and the valve 410 is in the default position 514. In such a configuration, fuel vapor may selectively be directed to either the external outlet 512 or the engine 304 without pressure buildup within the vapor control system 500a.

Figure 5B:
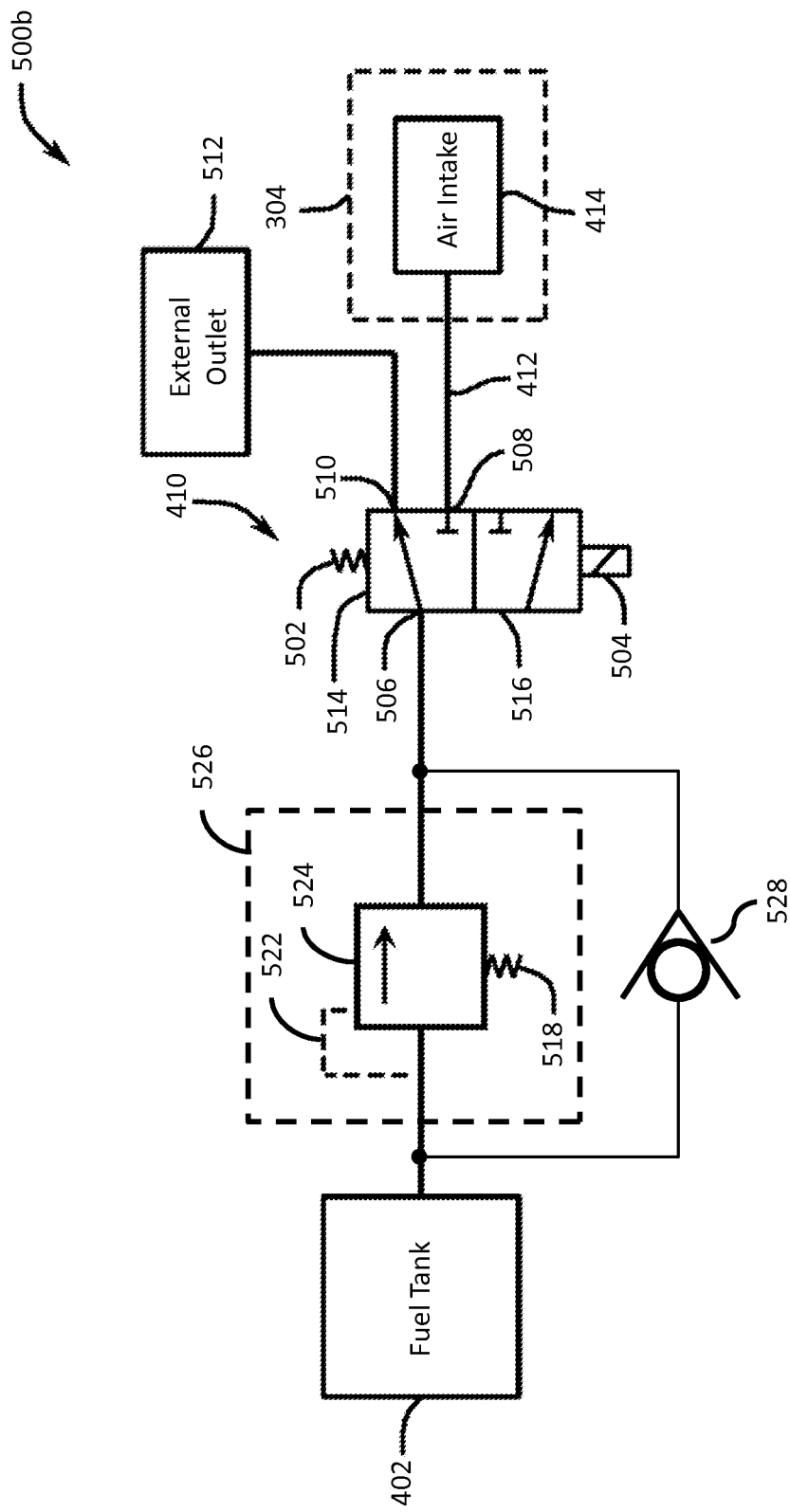
FIG. 5b illustrates a block diagram of a first embodiment of a system for controlling fuel vapor flow and pressure in an engine-driven generator using a three-way valve in accordance with aspects of the present disclosure.

FIG. 5b illustrates a block diagram of a first embodiment of a vapor control system 500b with pressure regulation for controlling fuel vapor flow and pressure in the engine-driven welding equipment 110 using a three-way valve 410 that directly enables flow from the inlet port 506 to the relief port 510, or from the inlet port 506 to the outlet port 508. The welding equipment 110 may direct fuel vapor to be used for engine 304 combustion while the engine 304, or welding equipment 110, is operating. In certain aspects it is useful to maintain a predetermined pressure in the fuel tank 402 while the engine 304 is operating. To accomplish this, a pressure regulator 526 may be positioned in series between the fuel tank 402 and the three-way valve 410 such that the pressure in the tank 402 may be a positive value. In certain aspects, an orifice may be provided to facilitate pressure regulation.

This configuration allows the fuel vapors to be directed to the engine 304 when running and solves engine run-on by blocking vapor to the engine 304 and directing vapor to atmosphere when the engine 304 is turned off. This configuration has an added benefit of improving fuel delivery to the engine 304 by using vapor pressure via a pressure regulating scheme to create an increased pressure in the fuel tank 402. This creates a pressure differential between the fuel tank 402 and engine 304 that effectively pushes the fuel 404 to the engine 304. Pushing the fuel 404 to the engine 304 eliminates fuel delivery issues, such as vapor lock, which is a result of fuel being "pulled" to the engine 304 by a fuel pump.

Pressure regulation, however, in the fuel tank 402 remains necessary so as not to overpressure the fuel tank 402 and also to ensure enough pressure is present to provide the necessary fuel delivery benefit. Pressure regulation can be achieved with the three-way valve 410 by incorporating a pressure regulator 526 to perform the regulation, such as an umbrella valve, reed valve, or other pressure regulating device, or by configuring the three-way valve 410 to act as a pressure regulator when directing vapor to the engine 304. As a result, when the pressure in the fuel tank 402 or the line between the fuel tank 402 and the three-way valve 410 exceeds a predetermined value, the pressure regulator 526 mitigates the pressure by releasing some of the excess fuel vapor.

In certain aspects, a check valve 528 may be provided in parallel with the pressure regulator 526 to allow air (e.g., from the atmosphere, or elsewhere) into the fuel tank 402 when a pressure within the fuel tank 402 (i.e., tank pressure) is negative. For example, if the fuel is not sufficiently vaporizing (often with cold temperatures) as the fuel level drops, air may enter the fuel tank 402 to maintain, for example, atmospheric pressure (or another predetermined pressure, such as a positive pressure) in the fuel tank 402.

The pressure regulator 526 may comprise, for example, a pilot line 522, a pressure relief valve 524, and a spring 518. In operation, fuel vapor pressure may flow through a pilot line 522, but when the force applied via the pilot line 522 is greater than the force applied by a spring 518, fuel vapor may be released from the fuel tank 402 to, for example, an external outlet, which may be an opening to the atmosphere or a connection to a storage container used to store fuel vapor. As will be appreciated, the pressure relief valve 526 may provide enhanced safety to the system 58 to inhibit excessive pressure buildup within the fuel line while maintaining a desired pressure in the fuel tank 402. For example, the pressure relief valve 526 may be configured to vent or release fuel vapor when pressure within the fuel line between the fuel tank 402 and the three-way valve 410 exceeds a safety threshold.

In certain circumstances, such welding equipment 110 may comply with regulatory agency requirements (e.g., Environmental Protection Agency (EPA)). Further, the welding equipment 110 as described herein may decrease or eliminate the occurrence of fuel vapor accumulation within the welding equipment 110. In addition, the occurrence of "dieseling" or "engine run on" conditions may be decreased or eliminated. More broadly, the three-way valve 410 and pressure regulator 526 may be separate, but placed in series to accomplish a desired configuration.

Figure 5C:
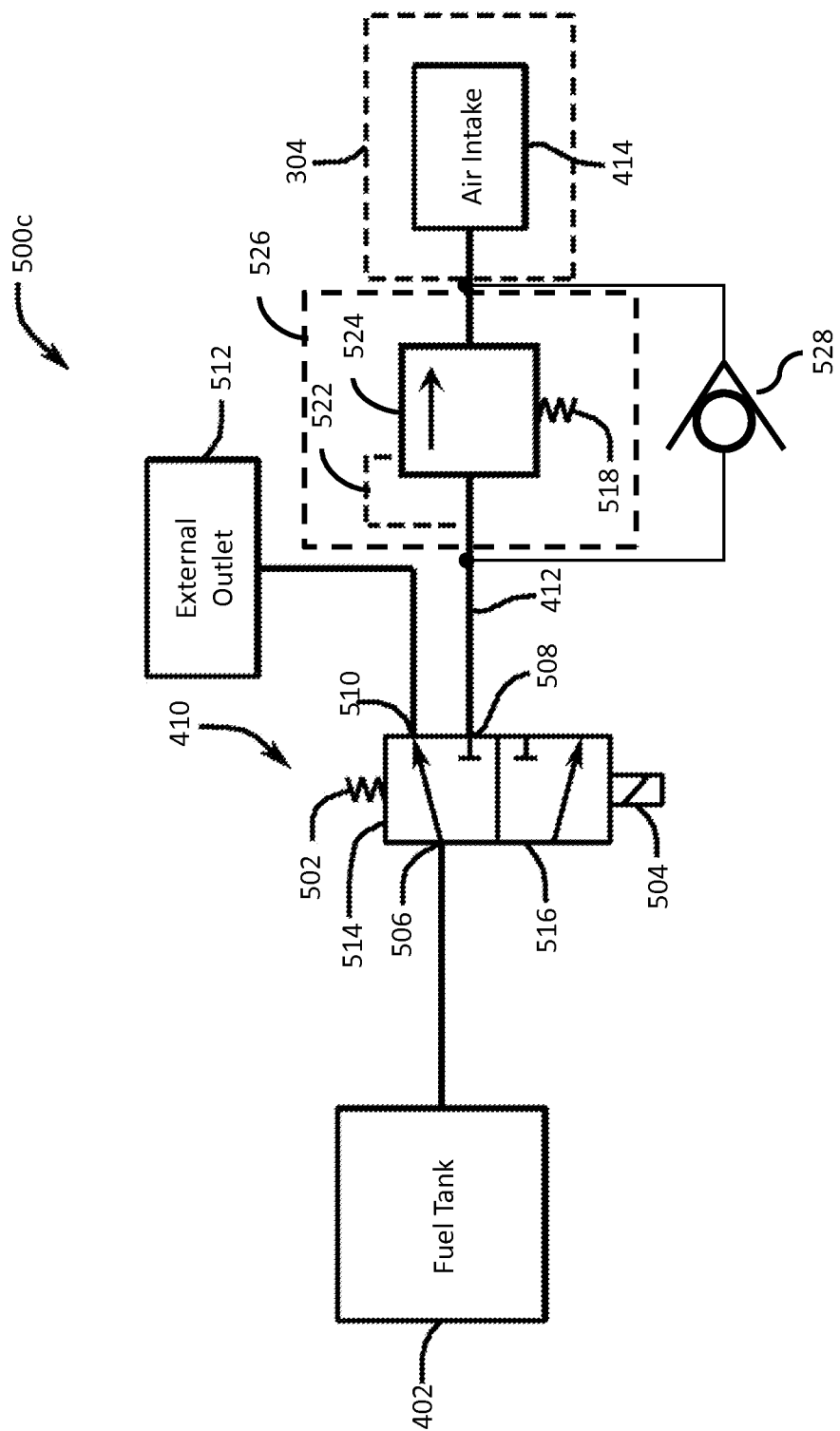
FIG. 5c illustrates a block diagram of a second embodiment of a system for controlling fuel vapor flow and pressure in an engine-driven generator using a three-way valve in accordance with aspects of the present disclosure.

FIG. 5c illustrates a block diagram of a second embodiment of a vapor control system 500c with pressure regulation for controlling fuel vapor flow and pressure in the engine-driven welding equipment 110 using a three-way valve 410 that directly enables flow from the inlet port 506 to the relief port 510, or from the inlet port 506 to the outlet port 508. As illustrated, the valve 410 includes a default position 514 and a controlled position 516. In certain aspects, pressure regulation may be performed on the output of the three-way valve 410 in the port leading to the engine 304. Thus, as illustrated, in lieu of positioning the pressure regulator 526 between the fuel tank 402 and the three-way valve 410 (as illustrated in FIG. 5b), the pressure regulator 526 may be positioned between the three-way valve 410 and the engine 304.

The pressure regulator 526 may be configured to release fuel vapor between the valve 410 and the fuel tank 402 (or the valve 410 and the air intake passage of the engine 304) when a pressure of the fuel vapor at the pressure regulator reaches a first threshold pressure, while the valve 410 positioned between the air intake passage of the engine 304 and the fuel tank 402 may be configured to enable release of fuel vapor when the pressure of the fuel vapor in the fuel tank reaches a second threshold pressure. In certain aspects, the valve 410 may permit a higher threshold pressure than the pressure regulator 526. For example, the pressure regulator 526's pressure relief valve 524 may be configured to vent or release fuel vapor when pressure (e.g., within the fuel tank 402 or within the line) exceeds a predetermined threshold pressure (e.g., a safety threshold), which may be a positive pressure value such as 0.5, 1.0, 3.0, or 5.0 PSI. The valve 410, however, may be configured to vent or release fuel vapor at a higher threshold pressure of, for example, between 5.0 and 10.0 PSI. Accordingly, if the pressure relief valve 524 does not release fuel vapor when expected, the valve 410 may operate as a backup pressure relief to inhibit over-pressurization from occurring. Alternatively, a pilot may be added to the valve.

Figure 6:
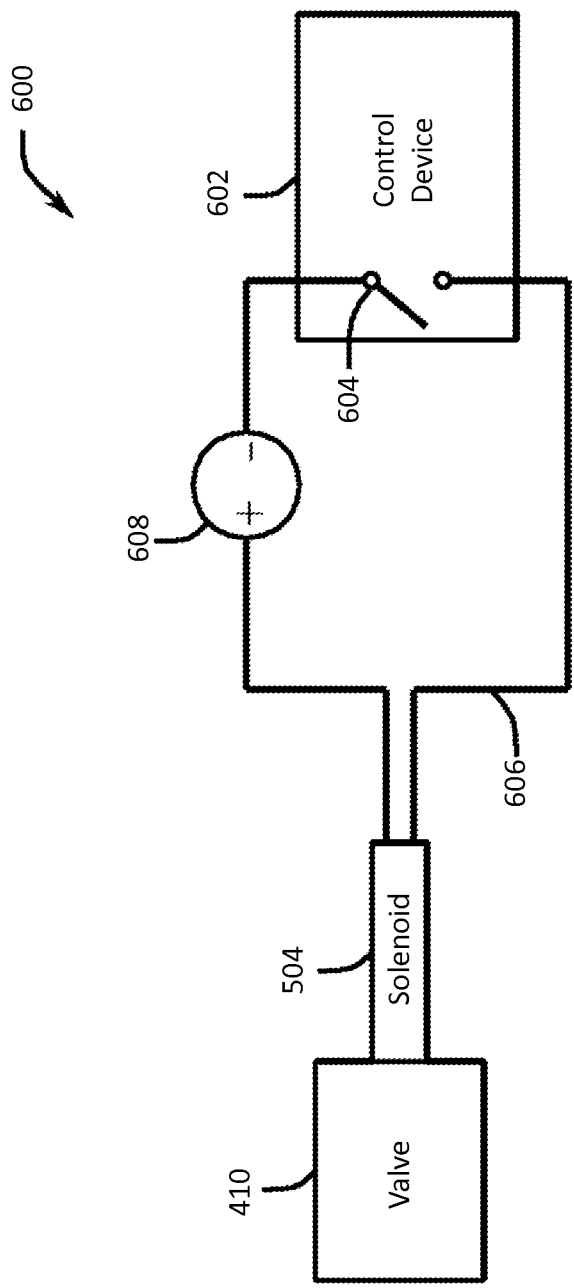
FIG. 6 illustrates a block diagram of an embodiment of an engine-driven generator system having a control device to transition a valve for controlling fuel vapor flow in accordance with aspects of the present disclosure.

FIG. 6 is a block diagram of an embodiment of an engine-driven generator system 600 having a control device 602 to transition the valve 410 for controlling fuel vapor flow. The control device 602 may be configured to cause the valve 410 to change between a default and controlled position in order to control the flow of fuel vapor between the fuel tank 402 and the engine 304. For example, the control device 602 may be configured to enable fuel vapor flow between the fuel tank 402 and the engine 304 in any of the following conditions: while the engine 304 is operating, while a key is inserted into an ignition switch, while an ignition switch is turned to an operating state, while an oil pressure is greater than a threshold pressure, while an engine temperature is greater than a threshold temperature, and so forth. Accordingly, a number of switches, sensors, and/or other devices may be used to actuate the valve 410, such as an oil pressure switch that measures oil pressure, or an electrical circuit that provides a measured voltage at a given time, which may be used to detect the presence of a predetermined voltage (e.g., an engine charging voltage, a generator voltage, etc.) or a predetermined frequency (e.g., an engine charging frequency, a generator frequency, etc.). The control device 602 may include any suitable hardware and/or software. For example, the control device 602 may include one or more processors, memory devices, storage devices, executable code, circuitry, or any combination thereof.

When the control device 602 determines that the valve 410 should be switched from the default position to the controlled position, the control device 602 may close a switch 604 (e.g., in other embodiments, the control device 602 may open the switch 604). It should be noted that the switch 604 may be any type of suitable switching device (e.g., a physical switch, a solid state device, etc.). With the switch 604 closed, a circuit 606 connected to the solenoid 504 becomes complete. Accordingly, a voltage from a voltage source 608 is applied to the solenoid 504 to energize the solenoid 504 and change the position of the valve 410. As will be appreciated, the solenoid 504 may be de-energized by opening the switch 604 of the control device 602. As such, the control device 602 may control when fuel vapor may flow between the fuel tank 402 and the engine 304.

FIG. 7 is a flow chart of an embodiment of a method 700 for controlling fuel vapor flow in the engine-driven generator welding equipment 110. The engine-driven generator welding equipment 110 may be configured to transition the valve 410 to a first position (e.g., controlled position 516) when the engine 304 begins operating (block 702). In the first position, fuel vapor may flow between the fuel tank 402 and the air intake 414 of the engine 304. In certain embodiments, the valve 410 may be transitioned to the first position when an oil pressure of the engine 304 or an ignition switch of the welding equipment 110 indicates that the engine 304 is operating. Furthermore, the engine-driven generator welding equipment 110 may be configured to transition the valve 410 to a second position (e.g., default position 514) when the engine 304 stops operating (block 704). In the second position, fuel vapor may be blocked or inhibited from flowing between the fuel tank 402 and the air intake 414 of the engine 304.

The present methods and systems may be realized in hardware, software, or a combination of hardware and software. The present methods and/or systems may be realized in a centralized fashion in at least one computing system or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art. Therefore, the above-described embodiments should be regarded as illustrative rather than restrictive. Accordingly, it should be appreciated that variations to those embodiments can be made by those skilled in the art without departing from the scope of the invention as defined by the following claims.

All documents cited herein, including journal articles or abstracts, published or corresponding U.S. or foreign patent applications, issued or foreign patents, or any other documents are each entirely incorporated by reference herein, including all data, tables, figures, and text presented in the cited documents.

What is claimed is:

1. An engine-driven generator comprising:
   an engine having an air intake passage, wherein the engine is configured to drive a generator;
   a fuel tank operatively coupled to the engine;
   a valve positioned between the fuel tank and the air intake passage,
      wherein the valve comprises an inlet, a first outlet, and a second outlet, the inlet being configured to receive fuel vapor from the fuel tank, the first outlet being configured to provide the fuel vapor to the air intake passage, and the second outlet being configured to provide the fuel vapor to the atmosphere or to a storage container;
   a pressure regulator positioned in line between the fuel tank and the air intake passage,
      wherein the pressure regulator comprises a pressure relief valve to release fuel vapor between the fuel tank and the air intake passage when a pressure of the fuel vapor reaches a predetermined threshold pressure;
   a check valve positioned in line between the fuel tank and the air intake passage and in parallel with the pressure regulator,
      wherein the check valve is configured to allow air into fuel tank when the pressure within the fuel tank is negative; and
   a control device to transition the valve between a first position and a second position,
      wherein the first position allows fuel vapor to flow from the fuel tank to the air intake passage, and the second position inhibits the fuel vapor from flowing from the fuel tank to the air intake passage.

2. The engine-driven generator of claim 1, wherein the valve is configured to be in the first position while the engine is operating and to be in the second position while the engine is not operating.

3. The engine-driven generator of claim 1, wherein the valve is configured to transition between the first position and the second position based on a measured oil pressure or a measured voltage.

4. The engine-driven generator of claim 1, wherein the second outlet is configured to provide the fuel vapor to a storage container.

5. An engine-driven generator comprising:
   an engine having an air intake passage, wherein the engine is configured to drive a generator;
   a fuel tank operatively coupled to the engine;
   a valve positioned between the fuel tank and the air intake passage;
   a pressure regulator positioned in line between the fuel tank and the air intake passage,
      wherein the pressure regulator comprises a pressure relief valve to release fuel vapor when a pressure of the fuel vapor reaches a predetermined threshold pressure;

a check valve positioned in line between the fuel tank and the air intake passage and in parallel with the pressure regulator,
wherein the check valve is configured to allow air into fuel tank when the pressure within the fuel tank is negative; and
a control device to transition the valve between a first position and a second position,
wherein the first position allows fuel vapor to flow from the fuel tank to the air intake passage and the second position inhibits the fuel vapor from flowing from the fuel tank to the air intake passage.

6. The engine-driven generator of claim 5, wherein the valve comprises an inlet, a first outlet, and a second outlet, the inlet being configured to receive fuel vapor from the fuel tank, the first outlet being configured to provide the fuel vapor to the air intake passage, and the second outlet being configured to provide the fuel vapor to the atmosphere or to a storage container.

7. The engine-driven generator of claim 5, wherein the pressure regulator is positioned in line between the fuel tank and the valve.

8. The engine-driven generator of claim 5, wherein the pressure regulator is positioned in line between the valve and the air intake passage.

9. The engine-driven generator of claim 5, wherein the air intake passage is configured to receive the fuel vapor and provide the fuel vapor to a carburetor.

10. The engine-driven generator of claim 5, wherein the air intake passage is configured to receive the fuel vapor and provide the fuel vapor to an electronic fuel injection system.

11. The engine-driven generator of claim 5, wherein the valve is configured to be in the first position while the engine is operating and to be in the second position while the engine is not operating.

12. The engine-driven generator of claim 5, wherein the predetermined threshold pressure is a positive pressure value less than, or equal to, 3.0 PSI.

13. The engine-driven generator of claim 5, wherein the valve is configured to transition between the first position and the second position based on a measured oil pressure or a measured voltage.

14. The engine-driven generator of claim 6, wherein the second outlet is configured to provide the fuel vapor to a storage container.

15. An engine-driven system comprising:
an engine having an air intake passage;
a fuel tank operatively coupled to the engine;
a valve coupled between the fuel tank and the air intake passage, the valve being configured to transition between a first position and a second position,
wherein the first position allows fuel vapor to flow between the fuel tank and the air intake passage and the second position inhibits the fuel vapor from flowing between the fuel tank and the air intake passage;
a pressure regulator positioned in line between the fuel tank and the engine, wherein the pressure regulator comprises a pressure relief valve to release fuel vapor between the fuel tank and the air intake passage when a pressure of the fuel vapor between the fuel tank and the air intake passage reaches a predetermined threshold pressure; and
a check valve positioned in line between the fuel tank and the air intake passage and in parallel with the pressure regulator,
wherein the check valve is configured to allow air into fuel tank when the pressure within the fuel tank is negative.

16. The engine-driven system of claim 15, wherein the pressure regulator is positioned in line between the fuel tank and the valve.

17. The engine-driven system of claim 15, wherein the pressure regulator is positioned in line between the valve and the air intake passage.

18. The engine-driven system of claim 15, wherein the predetermined threshold pressure is a positive pressure value less than, or equal to, 3.0 PSI.

19. The engine-driven system of claim 15, wherein the valve is configured to transition to the first position when the engine begins operating and to transition to the second position when the engine is not operating.

20. The engine-driven system of claim 15, wherein the valve is configured to transition between the first position and the second position based on a measured oil pressure or a measured voltage.

\* \* \* \* \*